United States Patent [19]

Hatakeyama et al.

[11] 4,259,625
[45] Mar. 31, 1981

[54] ROTATIONAL DIRECTION INDICATING APPARATUS

[75] Inventors: Akira Hatakeyama, Tokyo; Atsuo Matsuyama, Atsugi; Yutaka Moritake, Yamato, all of Japan

[73] Assignee: Sony Corporation, Tokyo, Japan

[21] Appl. No.: 908,361

[22] Filed: May 22, 1978

Related U.S. Application Data

[63] Continuation of Ser. No. 884,962, Mar. 9, 1978, abandoned.

[30] Foreign Application Priority Data

Mar. 9, 1977 [JP] Japan .................. 52-25616

[51] Int. Cl.³ ............................................. G05B 23/02
[52] U.S. Cl. ..................................... 318/328; 318/283
[58] Field of Search ............... 318/328, 618, 283, 284

[56] References Cited

U.S. PATENT DOCUMENTS

| | | | |
|---|---|---|---|
| 3,247,456 | 4/1966 | Dokter et al. | 318/328 X |
| 3,488,571 | 1/1970 | Tamaki | 318/328 X |
| 3,531,704 | 9/1970 | Uemura et al. | 318/328 |
| 3,728,565 | 4/1973 | O'Callaghan | 318/618 X |
| 4,091,314 | 5/1978 | Johnson | 318/328 X |

Primary Examiner—Gene Z. Rubinson
Assistant Examiner—W. E. Duncanson, Jr.
Attorney, Agent, or Firm—Lewis H. Eslinger; Alvin Sinderbrand

[57] ABSTRACT

A direction indicator for use in apparatus which includes a rotary member whose direction of rotation is determined by a command signal, the direction indicator providing an indication of the commanded direction just as, or momentarily prior to, the rotary member commences rotation in the commanded direction. A frequency generator generates a signal whose frequency is representative of the actual speed of the rotary member. A speed detector coupled to the frequency generator produces a pulse signal when the speed of the rotary member is less than a predetermined speed. A circuit is responsive to the direction command signal and is actuated by the pulse signal to provide an indicating signal corresponding to the direction of rotation determined by the command signal. The resultant indicating signal corresponds substantially to the actual direction of rotation of the rotary member.

15 Claims, 12 Drawing Figures

ROTATIONAL DIRECTION INDICATING APPARATUS

This application is a continuation of Ser. No. 884,962 filed Mar. 9, 1978, now abandoned.

BACKGROUND OF THE INVENTION

This invention relates to direction indicating apparatus and, more particularly, to such apparatus for providing an indication of the commanded direction of rotation of a rotary member just as, or momentarily prior to the instant that the rotary member commences rotation in the commanded direction.

In many motor control systems, it is both desirable and necessary to provide an indication of the actual direction of rotation of the motor. This, of course, corresponds to the actual direction of movement of a driven member. One example of apparatus which incorporates such a motor control system is tape recording and/or playback apparatus, such as an audio tape recorder, a video tape recorder (VTR) or a digital data recorder. In recorders of this type, information is recorded on and/or reproduced from a driven magnetic tape. Usually, the tape is driven by a combination of capstan and pinch roller, with the capstan being rotated by a controlled motor.

In apparatus of the type described above, a capstan-drive motor is selectively energized in accordance with the actual direction of rotation thereof. For example, if the motor is driven in a forward direction under the control of a typical motor control circuit, and if the direction of rotation then is to be reversed, such as for rewinding or reviewing a portion of the driven tape, the motor cannot be reversed instantaneously. Rather, the motor first must be decelerated and then, when motor speed is approximately zero, reversely energized for rewinding the tape. In such an operation, it is important to know the actual direction of rotation of the motor for the purpose of properly supplying forward and reverse energizing signals thereto. If a reverse energizing signal is supplied to the motor when the motor actually is rotating in a forward direction, possible damage thereto may occur.

Because of inertia inherent both in the motor, the capstan and the various tape drive elements, it is known that a substantial time delay is present between a change in the commanded direction of motor rotation, such as a change in a direction command signal produced by a suitable control circuit, and a corresponding change in the actual direction in which the motor rotates. This delay may vary as a function of mechanical constants, energizing and de-energizing, or braking, signals, motor currents, instantaneous motor speed, and the like. Hence, such delay is unpredictable and is not easily accounted for in selectively energizing, de-energizing or reversely energizing the motor. Consequently, there is a need for providing an indication of the actual direction of rotation of the motor, especially when the motor is controlled during a transition period whereby it is reversely driven.

It has been proposed heretofore to provide two phase-displaced sensors for sensing the rotation of a motor, these phase-displaced sensors being spaced apart by 90° such that the respective signals produced thereby provide indications both of speed and direction of rotation of the motor. For example, if a magnetic-type disc is secured to the motor shaft so as to be driven thereby, a pair of 90° phase-displaced magnetic sensors will produce respective pulse signals whose frequency corresponds to the rotary speed of the motor and whose phase relation represents the direction of rotation of the motor. That is, if the pulses generated by the sensors differ from each other by 90°, then it is determined that the motor is rotating in one direction. If the phase difference between these pulses is 270°, then it is determined that the motor is rotating in the opposite direction. As another example, a shutter disc provided with a series of circumferential apertures may be secured to the motor shaft and rotated past a pair of 90° phase-displaced photosensors, such as phototransistors. If light is projected onto the photosensors, this light will be interrupted as the shutter disc rotates, thereby resulting in two trains of pulses that are phase displaced with respect to each other by an amount corresponding to the direction of rotation of the motor, and the frequency of the pulses representing the speed of rotation of the motor.

While the use of a pair of sensors generally is adequate to provide an indication of the direction of rotation of the motor, this generally adds to the cost of manufacture and assembly of motor control apparatus. Furthermore, some manufacturers of motors are providing same with a single sensor integrally constructed therewith for providing a signal representing the actual speed of rotation of the motor. Such a motor would have to be dismantled and then reconstructed if a second sensor, heretofore needed for providing an indication of direction of rotation, is to be added. From the foregoing, it is appreciated that there has been a need for utilizing only a single sensor which provides merely an indication of the speed, but not direction, of rotation of a motor, to obtain an indication of rotational direction as well.

OBJECTS OF THE INVENTION

Therefore, it is an object of the present invention to provide improved apparatus for indicating the direction of rotation of a rotary member.

Another object of this invention is to provide apparatus for indicating the commanded direction of rotation of a rotary member just as, or momentarily prior to the instant that the rotary member commences rotation in the commanded direction, while using only a single speed sensor.

A further object of this invention is to provide improved rotational direction indicating apparatus for use in motor control apparatus.

An additional object of this invention is to provide motor control apparatus wherein a selectively energizable motor is controlled in accordance with the direction of rotation thereof, said direction of rotation being substantially detected with only a single speed sensor.

Yet another object of this invention is to provide improved motor control apparatus for use in a bidirectional tape transport system of the type which can be used in audio, video or data tape recording/playback apparatus.

A still further object of this invention is to provide improved apparatus for indicating the commanded direction of rotation of a rotary member as a function of the actual rotation thereof, which apparatus is relatively inexpensive to construct and assemble.

Various other objects, advantages and features of the present invention will become readily apparent from the ensuing detailed description, and the novel features will be particularly pointed out in the appended claims.

SUMMARY OF THE INVENTION

In accordance with the present invention, an indicating circuit for use in apparatus which includes a rotary member whose direction of rotation is determined by a command signal is provided, the indicating apparatus including a frequency generator for sensing the actual speed of the rotary member to produce a speed representing signal whose frequency is representative of the actual speed of the rotary member, a speed detector coupled to the frequency generator for producing a pulse signal when the speed of the rotary member is less than a predetermined speed, and a circuit responsive to the command signal and actuated by the pulse signal to provide an indicating signal corresponding to the direction of rotation determined by the command signal at the time that the pulse signal is produced. In one embodiment, the rotary member is driven by a motor which, in turn, is controlled by a control circuit that is responsive to various command signals for selectively energizing the motor. In this embodiment, the indicating signal is used to produce an aiding signal which is supplied to the motor control circuit in aiding relation to the command signal for supplementing the selective energization of the motor. As an example, the aiding signal is a braking signal to aid in decelerating the motor in the event that the direction of rotation thereof is commanded to be changed.

BRIEF DESCRIPTION OF THE DRAWINGS

The following detailed description, given by way of example, will best be understood in conjunction with the accompanying drawings in which.

DETAILED DESCRIPTION OF SOME OF THE PREFERRED EMBODIMENTS

Figure 1:
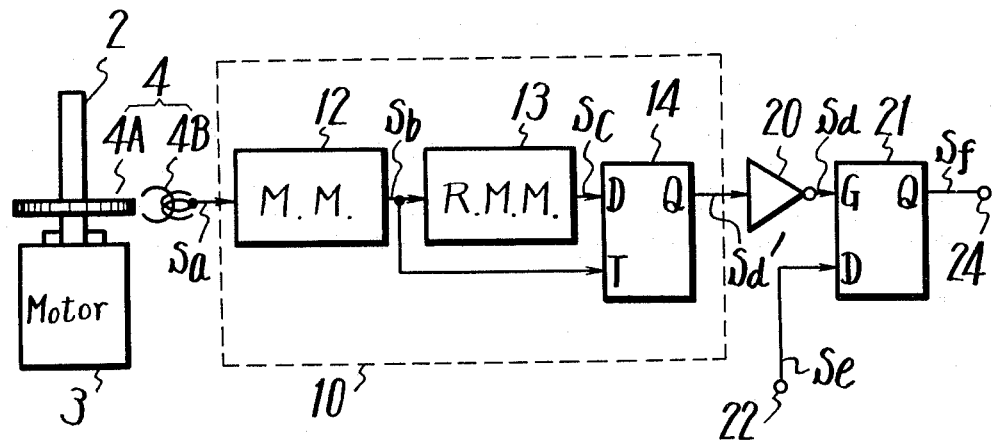
FIG. 1 is a logic diagram of one embodiment of the present invention.

Referring now to the drawings, wherein like reference numerals are used throughout, and in particular to FIG. 1, there is illustrated one embodiment of the present invention wherein a signal indicating substantially the actual direction of rotation of a driven rotary member is produced.

As used in the present specification and claims, the expression "an indication substantially of the actual direction of rotation" and the expression "a signal indicating substantially the actual direction of rotation" are intended to mean an indication or an indicating signal having a predetermined characteristic whose condition generally represents the actual direction of rotation, and the condition of such predetermined characteristic changes very close to the time that the actual direction of rotation changes but while the actual speed of rotation differs from zero by a substantially negligible amount. This will become readily apparent from the following description, and it will be seen that the signal illustrated in FIG. 3D represents "a signal indicating substantially the actual direction of rotation." For the purpose of the present discussion, it will be assumed that the rotary member is a capstan 2 bidirectionally driven by a selectively energizable motor 3. Capstan 2 may be used in cooperation with a pinch roller assembly (not shown) for driving tape, such as magnetic tape, at a speed and in a direction determined by the energization of motor 3. Of course, and as will be appreciated, motor 3 may be used to drive any other member mechanically coupled thereto, and the present invention need not be limited solely to a tape drive, or transport system.

The embodiment of FIG. 1 additionally includes a single frequency generator 4, a speed detector 10 and a sampling circuit 21. Frequency generator 4 is coupled to rotary member 2 and is adapted to produce a signal whose frequency represents the actual speed of rotation of the rotary member. In the illustrated embodiment, frequency generator 4 is comprised of a disc 4A secured to rotary member 2, or otherwise driven by motor 3 such that the rotary speed of disc 4A is synchronized with the rotary speed of member 2, disc 4A having spaced magnetic elements thereon. A magnetic pick-up sensor 4B, such as a pick-up coil, or the like, is juxtaposed disc 4A and is adapted to generate a series of pulses as the magnetic elements on disc 4A rotate therepast. As an alternative, disc 4A of frequency generator 4 may be a shutter disc, and sensor 4B may be a photosensor disposed on one side of the shutter disc with a light source disposed on the opposite side of the shutter disc. As may be appreciated, the series of pulses generated by sensor 4B have a frequency and pulse duration corresponding to the rotary speed of disc 4A, and thus the rotary speed of rotary member 2.

Speed detector 10 is comprised of a monostable multivibrator 12 coupled to sensor 4B for receiving each of the pulses generated by the sensor and being adapted to shape each pulse to exhibit a predetermined amplitude and duration. In one embodiment, monostable multivibrator 12 exhibits a time constant such that an output pulse is produced thereby whose duration is less than the shortest duration pulse expected from sensor 4B. The output of monostable multivibrator 12 is coupled to the input of a retriggerable monostable multivibrator 13 and, in addition, to a trigger input T of a D-type flip-flop circuit 14. Retriggerable monostable multivibrator 13 has a time constant which is substantially greater than the time constant of monostable multivibrator 12 and is adapted to be triggered to its unstable state in response to each pulse supplied thereto by monostable multivibrator 12. If, prior to returning to its stable state, another pulse is supplied to retriggerable monostable multivibrator 13, the monostable multivibrator is retriggered so as to remain in its initial unstable condition. If successive pulses supplied to the retriggerable monostable multivibrator are separated by a duration which exceeds the time constant thereof, then the retriggerable monostable multivibrator returns to its stable state, and a corresponding signal $S_c$ is produced at the output thereof. Of course, retriggerable monostable multivibrator 13 then resumes its unstable state in response to the next pulse supplied thereto by monostable multivibrator 12.

D-type flip-flop circuit 14 is a conventional bi-state device having a data input D and a trigger input T. In such a device, the state of the flip-flop circuit is determined by the logical sense of the signal supplied to the data input D at the time that a positive transition is supplied to its trigger input T. For example, if a binary "0" is supplied to input D, then D-type flip-flop circuit 14 is reset in response to a positive transition, or trigger signal, supplied to its trigger input T. This results in a binary "0" at the Q output of flip-flop circuit 14. Conversely, if a binary "1" is supplied to the D input at the time that a trigger signal is supplied to trigger input T, flip-flop circuit 14 is set, resulting in a binary "1" at its Q output. As shown, the output of retriggerable monostable multivibrator 13 is coupled to the data input D of D-type flip-flop circuit 14, and the output pulses produced by monostable multivibrator 12 are supplied as trigger signals to the trigger input T thereof.

The output of speed detector 10, and particularly the Q output of D-type flip-flop circuit 14, is coupled via an inverter 20 to sampling circuit 21. The sampling circuit also is supplied with a direction command signal $S_e$ which is applied to an input terminal 22. As will be described with respect to the embodiment shown in FIG. 4, direction command signal $S_e$ may be produced by suitable circuits and is adapted to be used for controlling the energization of motor 3, whereby the direction of rotation of the motor is determined, or commanded. In a preferred embodiment, the direction command signal is a bi-state signal wherein one state represents, for example, a forward direction, or energization, and another state of the direction command signal represents a reversed energization or direction of rotation. Sampling circuit 21 is adapted to sample the direction command signal by utilizing the output of speed detector 10 as a sampling pulse. The output of sampling circuit 21 is supplied to an output terminal 24 to provide a signal corresponding to the sampled direction command signal. In one embodiment, sampling circuit 21 is a triggerable latching circuit, such as a flip-flop circuit, shown herein as including a data input D coupled to input terminal 22 for receiving direction command signal $S_e$, and a trigger input G which is coupled to the output of speed detector 10 via inverter 20. Thus, the signal produced at output Q of flip-flop circuit 21 is equal to the state of direction command signal $S_e$ at the time that a trigger signal is supplied to trigger input G by speed detector 10.

Figure 2A:
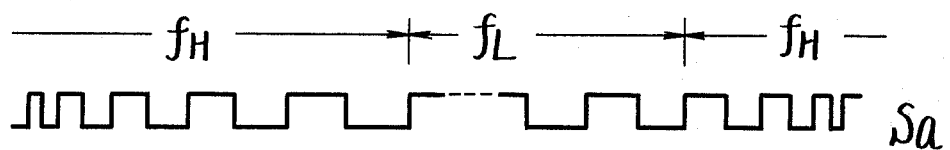
FIGS. 2A–2D are waveform diagrams which are useful in understanding the operation of the apparatus shown in FIG. 1.

The operation of the embodiment shown in FIG. 1 now will be described with reference to FIGS. 2A–2D and 3A–3D. Let it be assumed that a number of magnetic elements are provided on disc 4A. Hence, as rotary member 2 undergoes a single rotation, a number of pulses is produced by sensor 4B. These pulses, $S_a$, are shown in FIG. 2A. It is assumed that rotary member 2 is decelerated and then rotated in a reversed direction. Hence, the frequency of the pulses $S_a$ is seen to decrease from a higher frequency $f_H$ to a lower frequency $f_L$, until rotary member 2 stops. Then, consistent with the reversed energization of motor 3, the speed of the rotary member increases such that the frequency of the pulses $S_a$ increases from a lower frequency $f_L$ to a higher frequency $f_H$, corresponding to the higher, but reversed, speed of rotation of rotary member 2.

Figure 2B:
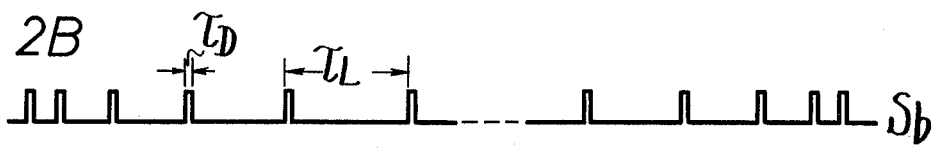

Pulses $S_a$ are supplied to and shaped by monostable multivibrator 12. The resultant pulses $S_b$ produced by this multivibrator, shown in FIG. 2B, exhibit uniform pulse duration $\tau_D$, and the separation between successive pulses is a function of the rotary speed of rotary member 2. Hence, and as shown in FIG. 2B, as rotary member 2 decelerates, successive pulses $S_b$ are spaced farther apart. That is, the time between successive pulses $S_b$ increases.

Retriggerable monostable multivibrator 13 is responsive to the negative transition of each pulse $S_b$ to be triggered to its unstable state. If it is assumed that the time constant of retriggerable monostable multivibrator 13 is equal to $\tau_c$ (FIG. 2C), then, in response to the negative transition in each pulse $S_b$, retriggerable monostable multivibrator 13 "times out" until, at a time $\tau_c$ following the occurrence of a negative transition in pulse $S_b$, the retriggerable monostable multivibrator returns to its stable state. However, if, while retriggerable monostable multivibrator 13 undergoes this time-out operation, another pulse $S_b$ is supplied thereto, the retriggerable monostable multivibrator is reset so as to resume its time-out operation from the beginning thereof. Accordingly, retriggerable monostable multivibrator 13 will return to its stable state only when the separation between successive pulses $S_b$ is greater than time constant $\tau_c$. This means that the retriggerable monostable multivibrator returns to its stable state when the rotational speed of rotary member 2 is less than some predetermined low speed $M_L$, corresponding to a separation $\tau_L$ between successive pulses $S_b$, wherein $\tau_L - \tau_D > \tau_c$.

In the embodiment shown herein, retriggerable monostable multivibrator 13 generates a negative-going pulse $S_c$ (FIG. 2C) when returning to its stable state. Thus, pulse $S_c$ is generated whenever the rotational speed of rotary member 2 is less than a predetermined speed $M_L$. Although this predetermined speed $M_L$ can be selected to be any desired low value, it preferably is selected to have a value such that the corresponding frequency of pulses $S_a$ representative thereof is only a few Hz, that is, just before the rotation of rotary member 2 is halted.

Figure 2C:
Figure 2D:
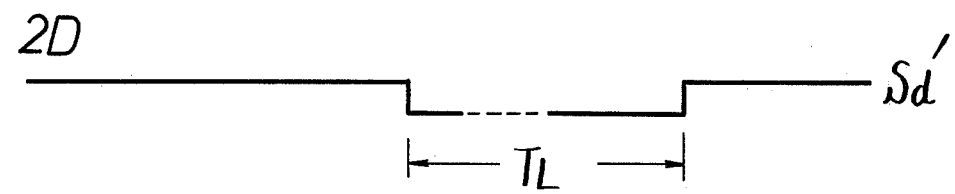

The output signal $S_c$ produced by retriggerable monostable multivibrator 13, and shown in FIG. 2C, is applied to the D input of D-type flip-flop circuit 14. Accordingly, the state of flip-flop circuit 14 is determined by signal $S_c$ at the time of occurrence of a positive transition in pulses $S_b$ which are applied to the trigger input T of the flip-flop circuit. If signal $S_c$ is at a relatively high level, such as a binary "1", flip-flop circuit 14 is set to a correspondingly high level in response to each trigger signal $S_b$ applied thereto. However, if signal $S_c$ is of a relatively low level, such as a binary "0", when a trigger signal $S_b$ is applied to flip-flop circuit 14, then the flip-flop circuit is triggered to its reset condition, represented by a relatively low signal $S_d'$ at the Q output thereof. This is shown by the waveform of FIG. 2D. Flip-flop circuit 14 remains in its reset state as long as signal $S_c$ is at a relatively low level at the time of occurrence of each trigger signal $S_b$. When signal $S_c$ is at a relatively high level upon the occurrence of the next trigger signal $S_b$, flip-flop circuit 14 is set. This is represented by the duration $T_L$ of signal $S_d'$ shown in FIG. 2D.

In FIGS. 2A–2D, it is assumed that the speed of rotation (irrespective of the direction of rotation) of rotary member 2 is equal to or less than predetermined speed $M_L$ when pulses $S_a$ exhibit a relatively low frequency $f_L$. That is, throughout this range $f_L$, the signal $S_c$ produced by retriggerable monostable multivibrator 13 is at a relatively low level at each occurrence of a trigger signal $S_b$. Hence, the duration $T_L$ at which flip-flop circuit 14 is reset corresponds substantially to the interval during which rotary member 2 is decelerated and then accelerated in a reverse direction. At the beginning of duration $T_L$, rotary member 2 is almost stopped. At the central portion of duration $T_L$, the actual speed of rotary member 2 is zero. Then, the direction of rotation of the rotary member is reversed, and its rotary speed is equal to about $M_L$ at the end of duration $T_L$. Of course, if the direction of rotation of rotary member 2 is not reversed, that is, if the rotary member merely is decelerated until it stops, pulse signals $S_a$ no longer will be produced. Hence, trigger signals $S_b$ likewise will not be produced, and flip-flop circuit 14 will maintain its reset state.

Figure 3A:
FIGS. 3A–3F are waveform diagrams which are helpful in understanding the operation of another embodiment of the present invention.
Figure 3B:

Let it be assumed that direction command signal $S_e$, supplied to input terminal 22 by a suitable control circuit (not shown in FIG. 1), is a bistate signal of the type shown in FIG. 3A. For the purpose of convenience, let it be further assumed that when direction command signal $S_e$ is at a relatively high level, such as a binary "1", motor 3 is commanded to drive rotary member 2 in a positive rotary direction. Conversely, when direction command signal $S_e$ exhibits a relatively low level, such as a binary "0", motor 3 is commanded to drive rotary member 2 in a negative rotary direction. Thus, as is appreciated from the waveform shown in FIG. 3A, direction command signal $S_e$ shown therein is assumed to command motor 3 to drive rotary member 2 in the positive direction, and then to reverse the direction of the rotary member, and then to reverse the direction of rotation once again. Assuming that constant deceleration and acceleration drive signals are supplied to motor 3 at the occurrence of the respective transitions in direction command signal $S_e$, a graphical depiction of the speed at which rotary member 2 is driven is shown in FIG. 3B. As depicted therein, rotary member 2 first is driven at a constant speed $M_H$ in the positive direction, and then the rotary member is decelerated commencing at the negative transition in direction command signal $S_e$. Thus, the speed of the rotary member is reduced at a constant negative slope such that the speed of the rotary member changes from $+M_H$ to the aforementioned predetermined low speed $+M_L$, and then is reduced to zero prior to increasing in the opposite direction from $-M_L$ to $-M_H$. Similarly, commencing with the positive transition in direction command signal $S_e$, rotary member 2 is decelerated from a speed of $-M_H$ to zero, and then is accelerated from zero to $+M_H$, all at a constant slope. From the foregoing discussion of the operation of the embodiment shown in FIG. 1, as depicted in the waveforms shown in FIGS. 2A-2D, it is appreciated that, when the speed of rotary member 2 is between $+M_L$ and $-M_L$, flip-flop circuit 14 admits of its reset condition to produce pulse signal $S_d'$ of duration $T_L$ (FIG. 2D), this pulse signal being inverted by inverter 20 to pulse signal $S_d$, redrawn in FIG. 3C with a compressed time-axis. That is, pulse signal $S_d$ is produced when speed detector 10 detects the actual speed of rotary member 2 as being less than the predetermined speed $M_L$. That is, pulse signal $S_d$ is derived from speed detector 10 when the speed detector detects that the actual speed of rotary member 2 is less than predetermined speed $M_L$.

Pulse signal $S_d$ is used to trigger flip-flop circuit 21 to a state corresponding to the state of direction command signal $S_e$. Stated otherwise, pulse signal $S_d$ is used to sample the state of the direction command signal. At the time of occurrence of the first pulse signal $S_d$ shown in FIG. 3C, direction command signal $S_e$ is at a relatively low level. This corresponds to a command for reversed direction at a time at which the actual rotational speed of rotary member 2 is about to be reversed. Hence, flip-flop circuit 21 is reset to produce an indicating signal $S_f$ of relatively low level corresponding to the relatively low level of direction command signal $S_e$. At the occurrence of the next pulse signal $S_d$, corresponding to the time at which the rotational direction of rotary member 2 again is about to be reversed, direction command signal $S_e$ is at a relatively high level. Hence, flip-flop circuit 21 now is set to produce indicating signal $S_f$ of a correspondingly high level. Thus, it is seen that flip-flop circuit 21 is triggered at the time of occurrence of the positive transition of pulse signal $S_d$ to a state determined by the state of direction command signal $S_e$. That is, flip-flop circuit 21 is triggered at the approximate time at which rotary member 2 is about to rotate in the direction actually commanded by direction command signal $S_e$.

Figure 3C:
Figure 3D:
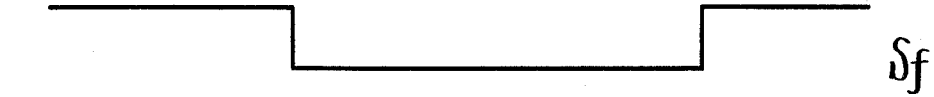

The time of occurrence of the positive transition in pulse signal $S_d$ differs from the time of occurrence of zero speed of rotary member 2 by an amount $\Delta M$, as shown in FIG. 3C. This amount $\Delta M$ represents the actual error in indicating signal $S_f$. That is, if the respective transitions in indicating signal $S_f$ are shifted to the right by an amount $\Delta M$, then the state of the indicating signal $S_f$ will be precisely indicative of the actual rotational direction of rotary member 2. However, this error $\Delta M$ is a function of time constant $\tau_c$ of retriggerable monostable multivibrator 13. If this time constant is increased, the error $\Delta M$ is reduced. Thus, depending upon the predetermined speed $M_L$ at which pulse signal $S_d$ is produced, error $\Delta M$ can be minimized to a substantially negligible value. As another alternative, since rotary member 2 is decelerated at a substantially constant rate from predetermined speed $M_L$ to zero, a suitable delay circuit, such as another monostable multivibrator, can be interconnected between inverter 20 and flip-flop circuit 21 so as to compensate for, and thus eliminate, error $\Delta M$.

Figure 4:
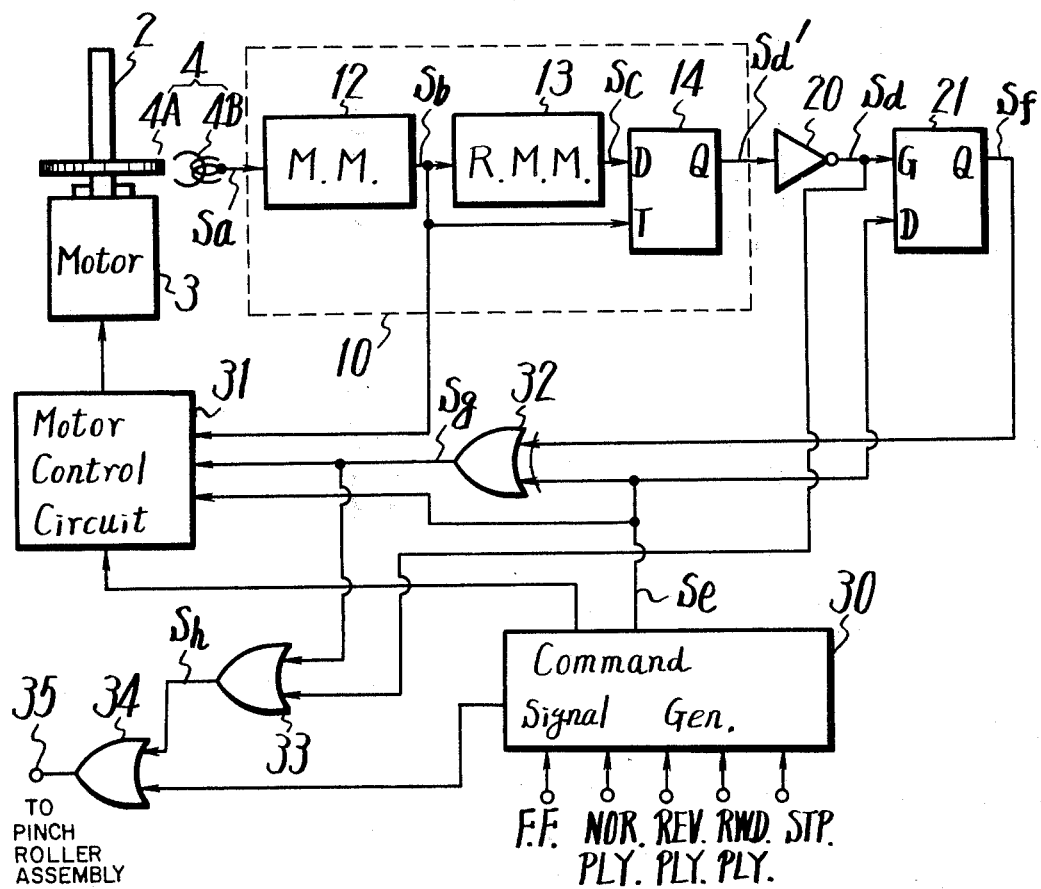
FIG. 4 is a logic diagram of another embodiment of the present invention.

Turning now to FIG. 4, there is illustrated another embodiment of the present invention. In this embodiment, rotary member 2, frequency generator 4, speed detector 10 and sampling circuit 21 are identical to the corresponding elements shown and described hereinabove with respect to FIG. 1. FIG. 4 also illustrates a command signal generator 30 which is responsive to various input signals supplied thereto for producing selected command signals, such as direction command signal $S_e$. Command signal generator 30, although forming no part of the present invention per se, may be formed of conventional logic circuitry for producing the direction command signal as well as a speed command signal and a pinch roller command signal. When used in the environment of tape recording/playback apparatus, various control signals are supplied to the command signal generator, these control signals being produced automatically by appropriate control circuits, or in response to the manual actuation of selected control switches. As an example, command signal generator 30 is supplied with a stop (STP) control signal, a rewind-play (RWD PLY) control signal, a reverse-play (REV PLY) control signal, a normal play (NOR PLY) control signal, and a fast-forward (FF) control signal. Additional control signals, not shown, also may be supplied to command signal generator 30. The function of the various control signals is believed to be self-evident, and further description thereof is not provided.

In the embodiment shown in FIG. 4, motor 3 is selectively energized by a motor control circuit 31. The motor control circuit is adapted to supply a suitable energizing signal to control the direction and speed of rotation of motor 3, and thus rotary member 2, in accordance with various control signals supplied thereto. Accordingly, motor control circuit 31 includes suitable control circuitry, not shown, to which are supplied speed indicating signals $S_b$ (shown in FIG. 2B), direction command signal $S_e$ (shown in FIG. 3A), a speed command signal derived from command signal generator 30 and a braking signal $S_g$. The braking signal is produced by an exclusive-OR circuit 32 having respective inputs connected to flip-flop circuit 21 and command signal generator 30 for receiving the direction indicating signal $S_f$ (shown in FIG. 3D) and the direction command signal $S_e$.

When used in the environment of a tape drive, or transport, system in a tape recorder/reproducer, it is conventional to selectively energize and de-energize a pinch roller assembly for driving and stopping magnetic tape, respectively. That is, when the pinch roller assembly is energized, the pinch roller engages the magnetic tape and capstan, whereby the tape is driven. When the pinch roller is de-energized, it is withdrawn from the capstan, thus terminating a capstan-driving force on the tape. Although not shown herein, it is appreciated that the pinch roller assembly may include a selectively energized solenoid, as is conventional, to correspondingly energize or de-energize the pinch roller. OR circuits 33 and 34 are provided for selectively energizing and de-energizing the pinch roller assembly. As shown, OR circuit 33 includes one input connected to receive the braking signal produced by exclusive-OR circuit 32 and another input connected to receive pulse signal $S_d$ (shown in FIG. 3C). The output of OR circuit 33 is connected to a respective input of another OR circuit 34, and this OR circuit includes an additional input connected to receive a pinch roller command signal from command signal generator 30. The output of OR circuit 34 is connected to an output terminal 35 which, in turn, is connected to the pinch roller assembly and, more particularly, to the solenoid therein for selectively energizing or de-energizing the pinch roller.

In operation, let it be assumed that command signal generator 30 provides direction command signal $S_e$ of the type shown in FIG. 3A. Hence, at the first, or negative transition of direction command signal $S_e$, rotary member 2, here forming the capstan of the tape drive system, is decelerated to zero and then accelerated in the opposite direction. At the next, or positive transition in direction command signal $S_e$, the capstan is decelerated and then accelerated in the forward direction. It is recalled from FIG. 1 that, as capstan 2 is driven, pulses $S_b$ produced by monostable multivibrator 12 have a frequency which is in direct relationship to the actual speed of the capstan. These pulses are supplied to motor control circuit 31 and are used in a servo circuit to drive motor 3 at a desired speed. This speed is determined by the speed command signal supplied to motor control circuit 31 from command signal generator 30 and, also, by the direction command signal $S_e$ which also is supplied to the motor control circuit.

Figure 3E:

As described above, when capstan 2 decelerates until the relatively low predetermined speed $M_L$ is obtained, pulse signal $S_d$ (FIG. 3C) is produced. This, in turn, triggers flip-flop circuit 21 to the state determined by direction command signal $S_e$. Hence, in the assumed example, flip-flop circuit 21 is reset, whereby indicating signal $S_f$ assumes the same state as direction command signal $S_e$, as shown in FIG. 3D. Now, exclusive-OR circuit 32 receives both the direction command signal $S_e$ and the indicating signal $S_f$. As is known, an exclusive-OR circuit produces an output signal of one state, for example, a binary "1", when the respective input signals supplied thereto differ from each other; and the exclusive-OR circuit produces an output signal of an opposite state, for example, a binary "0", when the respective input signals supplied thereto are equal. Furthermore, it is appreciated that, during normal, or steady state operation of motor 3, direction command signal $S_e$ and indicating signal $S_f$ are equal to each other. Consequently, when direction command signal $S_e$ undergoes the negative transition shown in FIG. 3A, the respective signals supplied to exclusive-OR circuit 32 differ from each other, resulting in a binary "1" output signal $S_g$ produced by this exclusive-OR circuit. That is, signal $S_g$ is produced when motor 3 and capstan 2 are decelerated. At the time that the capstan is sufficiently decelerated such that pulse signal $S_d$ is produced and indicating signal $S_f$ undergoes a negative transition, as shown in FIGS. 3C and 3D, respectively, the signals supplied to exclusive-OR circuit 32 are equal and, therefore, signal $S_g$ produced thereby is terminated. This is shown in FIG. 3E.

Signal $S_g$ is supplied to motor control circuit 31 and is utilized therein as an additional, or aiding signal, to aid in decelerating motor 3. Hence, for the purpose of the present discussion, signal $S_g$ is characterized as a braking signal because it is utilized to provide additional deceleration of motor 3. That is, braking signal $S_g$ increases the driving force which is imparted to motor 3, this driving force being a decelerating, or braking force, as determined by direction command signal $S_e$ and the speed command signal which are supplied to motor control circuit 31.

Figure 3F:
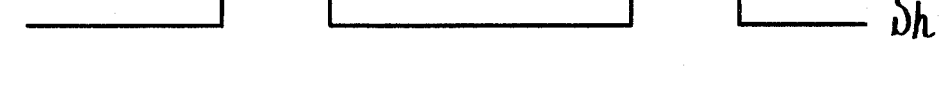

Signal $S_g$ also is supplied through OR gate 33 to initiate de-energizing pulse $S_h$, as shown in FIG. 3F. This de-energizing pulse is, in turn, transmitted through OR gate 34 to output terminal 35 for de-energizing the pinch roller which is used in cooperation with capstan 2 to drive tape. Hence, as deceleration, or braking of motor 3 commences, as when direction command signal $S_e$ undergoes a transition, de-energizing pulse $S_h$ is initiated to de-energize the pinch roller and, therefore, cooperate in decelerating the tape driven by capstan 2 and the pinch roller. At the time that signal $S_g$ terminates, it is appreciated that the speed of capstan 2 can be somewhere within the range between $+M_L$ and $-M_L$. Hence, the speed of the capstan may be so slow that it is preferred not to energize the pinch roller to contact the capstan at this time. Accordingly, the de-energizing of the pinch roller assembly is not yet terminated, and de-energizing pulse $S_h$ is extended beyond the time that signal $S_g$ terminates. It is for this reason that OR gate 33, which produces de-energizing pulse $S_h$, is supplied with pulse signal $S_d$. Hence, although signal $S_g$ terminates, as shown in FIG. 3E, pulse signal $S_d$ does not terminate until a subsequent duration $T_L$ thereafter. De-energizing pulse $S_h$ is seen to terminate when pulse signal $S_d$ terminates. Thus, the pinch roller assembly is de-energized at the time that direction command signal $S_e$ undergoes a transition, and the pinch roller assembly remains de-energized until the direction of rotation of capstan 2 has been reversed and the rotary speed thereof exceeds $M_L$.

When the direction of rotation of capstan 2 again is reversed in response now to the positive transition in direction command signal $S_e$, aiding signal $S_g$ again is produced to aid in decelerating the capstan, and de-energizing pulse $S_h$ also is produced to de-energize the pinch roller assembly until the direction of rotation of the capstan has been reversed and its speed in the opposite direction exceeds $M_L$. Since the manner in which signals $S_g$ and $S_h$ are produced, and the manner in which the signals control the operation of the tape transport system already have been discussed above, further description thereof is not provided.

In addition to de-energizing pulse $S_h$, the pinch roller command signal generated by command signal generator 30 also is supplied to output terminal 35 through OR gate 34 so as to selectively energize and de-energize the pinch roller assembly independent of the rotational direction and speed of capstan 2. For example, during a PLAY mode, the pinch roller assembly is energized so as to contact capstan 2, thereby driving tape. If a STOP operation is to be performed, the speed of capstan 2 is not altered, but the pinch roller assembly is de-energized so as to release the capstan, and thereby stop the movement of tape. A suitable de-energizing pulse is provided at output terminal 35 in accordance with this STOP operation, and in the absence of de-energizing pulse $S_h$.

Therefore, in accordance with the foregoing description, it is seen that the present invention finds ready application with apparatus which includes a rotary member, such as a capstan in a tape drive or transport system, whose direction of rotation is determined by a command signal. By utilizing only a single frequency generator, an indicating signal $S_f$ is produced whose state is indicative substantially of the actual direction of rotation of the rotary member. This differs from prior art systems wherein two or more frequency generators are necessary to provide a comparable direction indicating signal. Thus, the present invention is a significant simplification over the prior art, thus reducing manufacturing and assembly costs. Also, since many motor drive systems are provided with a single frequency generator integrally constructed therewith, the present invention obviates complicated and expensive reconstruction of such motor drive systems, and avoids the need to provide auxiliary speed and rotation direction sensing devices. Also, when used in conjunction with a motor control circuit, such as shown and described with respect to FIG. 4, motor deceleration can be supplemented so as to provide an additional positive decelerating force, whereby the time delay for such deceleration is reduced. Also, by providing de-energizing pulse $S_h$, the load on capstan drive motor 3 during the transient stage, that is, when the capstan is rotated at a speed between $+M_L$ and $-M_L$, is reduced, thereby avoiding the possibility of damaging the tape which is driven by the capstan.

While the present invention has been particularly shown and described with respect to certain preferred embodiments thereof, it will be readily apparent to one of ordinary skill in the art that various changes and modifications in form and details can be made without departing from the spirit and scope of the invention. Therefore, it is intended that the appended claims be interpreted as including all such changes and modifications.

What is claimed is:

1. In apparatus including a rotary member whose direction of rotation is determined by a command signal, indicating means comprising frequency generating means for sensing the actual speed of said rotary member to produce a speed representing signal whose frequency is representative of the actual speed of said rotary member; speed detecting means coupled to said frequency generating means for producing a pulse signal when the speed of said rotary member is less than a predetermined speed; and means responsive to said command signal and actuated by said pulse signal to provide an indicating signal corresponding to the direction of rotation determined by said command signal at the time that said pulse signal is produced.

2. The apparatus of claim 1 wherein said command signal is a bi-state signal having one state to determine rotation in a first direction and a second state to determine rotation in a second, opposite direction; and wherein said indicating signal also is a bi-state signal whose state indicates substantially the actual direction of rotation of said rotary member.

3. The apparatus of claim 2 wherein said means to provide an indicating signal comprises sampling means responsive to said pulse signal for sampling said command signal, thereby to provide said indicating signal corresponding to the state of said sampled command signal.

4. The apparatus of claim 3 wherein said sampling means comprises a triggerable flip-flop circuit having a data input terminal connected to receive said command signal and a trigger input terminal responsive to said pulse signal to actuate said flip-flop circuit to a state corresponding to said command signal.

5. The apparatus of claim 4 wherein said frequency generating means includes pulse generating means for generating a train of pulses having a repetition rate proportional to said actual speed of said rotary member; and wherein said speed detecting means comprises monostable multivibrator means having a time constant substantially equal to the separation between successive ones of said pulses which are generated when said rotary member rotates at said predetermined speed, said monostable multivibrator means being coupled to said pulse generating means and actuated to its unstable state in response to each pulse, whereby said pulse signal is produced when said monostable multivibrator means returns to its stable state at the conclusion of the time constant thereof.

6. The apparatus of claim 5 wherein said speed detecting means further comprises another flip-flop circuit having a data input terminal connected to receive the output of said monostable multivibrator means and a trigger input terminal responsive to said generated pulses to actuate said another flip-flop circuit to a state corresponding to the state of said monostable multivibrator, thereby producing said pulse signal at the output of said another flip-flop circuit with a duration equal to the time that the speed of said rotary member is less than said predetermined speed.

7. The apparatus of claim 6 wherein said pulse generating means comprises a disc secured to said rotary member and having spaced magnetic elements thereon, a magnetic pick-up sensor fixed with respect to said disc to sense said magnetic elements as said disc rotates so as to produce corresponding pulses, and pulse shaping means coupled to said magnetic pick-up sensor for shaping said pulses to have uniform duration.

8. In a motor control system of the type having a motor for driving a rotary member, a source of command signals to determine the operating condition and direction of rotation of said motor, and a motor control circuit responsive to said command signals for selectively energizing said motor, apparatus comprising frequency generating means for sensing the actual speed of said rotary member to produce a speed representing signal whose frequency is representative of the actual speed of said rotary member; speed detecting means coupled to said frequency generating means for producing a pulse signal when the speed of said rotary member is less than a predetermined speed; means responsive to a direction command signal and actuated by said pulse signal to provide an indicating signal corresponding to the direction of rotation commanded by said direction command signal at the time that said pulse signal is produced; and means responsive to said indicating signal for supplying an aiding signal to said motor control circuit in aiding relation to said command signal for supplementing the energization of said motor.

9. The apparatus of claim 8 wherein said means for supplying an aiding signal comprises pulse producing means for producing a braking pulse supplied to said motor control circuit when said command signal commands a change in the direction of rotation of said motor.

10. The apparatus of claim 9 wherein said means for producing a braking pulse is responsive to a change in state of said direction command signal, representing a commanded change in direction of rotation, to initiate said braking pulse, and is responsive to a change in the state of said indicating signal to terminate said braking pulse.

11. The apparatus of claim 9 wherein said means for producing a braking pulse comprises exclusive-OR means having one input connected to receive said direction command signal and another input connected to receive said indicating signal for producing said braking pulse when said direction command and indicating signals differ from each other.

12. The apparatus of claim 9 wherein said motor control system is used in a tape drive system, said rotary member is a capstan for driving said tape, and said apparatus further includes a selectively energized pinch roller for engaging said tape and capstan to enable said capstan to drive said tape, and pinch roller control means responsive to said braking pulse for de-energizing said pinch roller.

13. The apparatus of claim 12 wherein said pinch roller control means comprises OR-gate means having one input connected to receive said braking pulse and another input connected to receive said pulse signal produced by said speed detecting means for producing a de-energizing pulse having a duration substantially equal to the duration of said braking pulse plus the duration of said pulse signal.

14. The apparatus of any one of claims 8, 9, 10, 11, 12 or 13 wherein said direction command signal is a bi-state signal having one state to determine rotation in a first direction and a second state to determine rotation in a second, opposite direction; said indicating signal also is a bi-state signal whose state indicates substantially the actual direction of rotation of said rotary member; and said means to provide an indicating signal comprises triggerable flip-flop means having a data input terminal connected to receive said direction command signal and a trigger input terminal responsive to said pulse signal to actuate said flip-flop means to a state corresponding to said direction command signal.

15. The apparatus of claim 14 wherein said frequency generating means includes pulse generating means for generating a train of pulses having a repetition rate proportional to said actual speed of said rotary member; and said speed detecting means comprises monostable multivibrator means having a time constant substantially equal to the separation between successive ones of said pulses which are generated when said rotary member rotates at said predetermined speed, said monostable multivibrator means being coupled to said pulse generating means and actuated to its unstable state in response to each pulse, whereby said pulse signal is produced when said monostable multivibrator means returns to its stable state at the conclusion of the time constant thereof.

* * * * *